United States Patent [19]

Weber

[11] Patent Number: 4,674,221

[45] Date of Patent: Jun. 23, 1987

[54] FISHING NET

[76] Inventor: Robert W. Weber, P.O. Box 193, Hamilton, Tex. 76531

[21] Appl. No.: 835,780

[22] Filed: Mar. 3, 1986

[51] Int. Cl.⁴ ............................................. A01K 77/00
[52] U.S. Cl. .............................................. 43/11; 43/12
[58] Field of Search ..................................... 43/1, 11, 12

[56] References Cited

U.S. PATENT DOCUMENTS

| 116,652 | 7/1871 | Way ....................................... 43/11 |
| 1,580,543 | 4/1926 | Smith ..................................... 43/11 |
| 2,782,546 | 2/1957 | Edworthy .............................. 43/11 |
| 2,921,397 | 1/1960 | Luthi ...................................... 43/11 |
| 4,450,643 | 5/1984 | Cox ........................................ 43/12 |
| 4,516,347 | 5/1985 | Dickie .................................... 43/11 |

Primary Examiner—M. Jordan
Attorney, Agent, or Firm—Kanz, Scherback & Timmons

[57] ABSTRACT

A fishing net having a handle supporting a frame defining an opening and a net mounted to the perimeter of the frame. A guide member is pivotally mounted in a gap in the frame and connected to the net. The guide member is adapted to receive a fishing line on which a fish is caught. The fishing line is pulled upwards through the guide member and pulls the fish into engagement with the net. The fishing net is then inverted with the fish captured in the net. Preferably, the guide member includes a latch member for securing the fishing line within the guide member.

15 Claims, 8 Drawing Figures

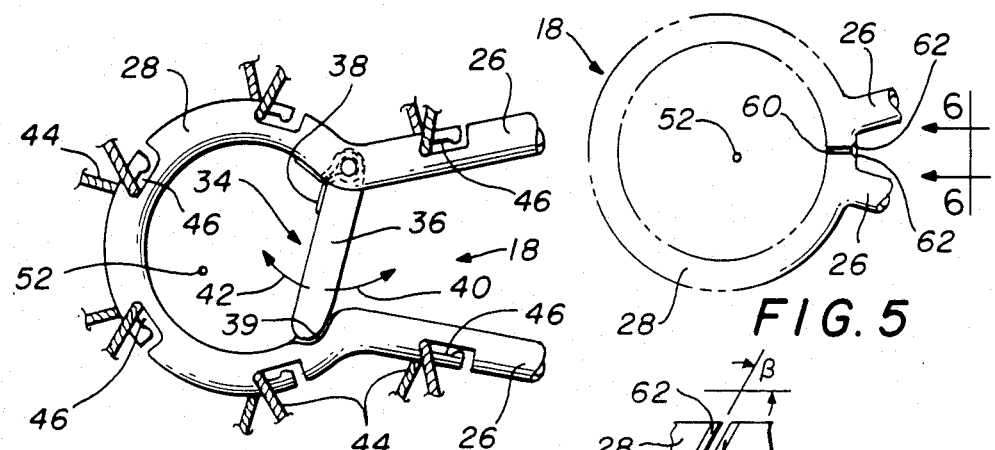
FIG. 3
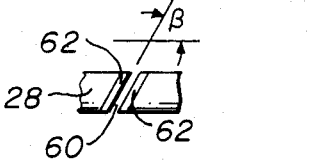
FIG. 5
FIG. 6
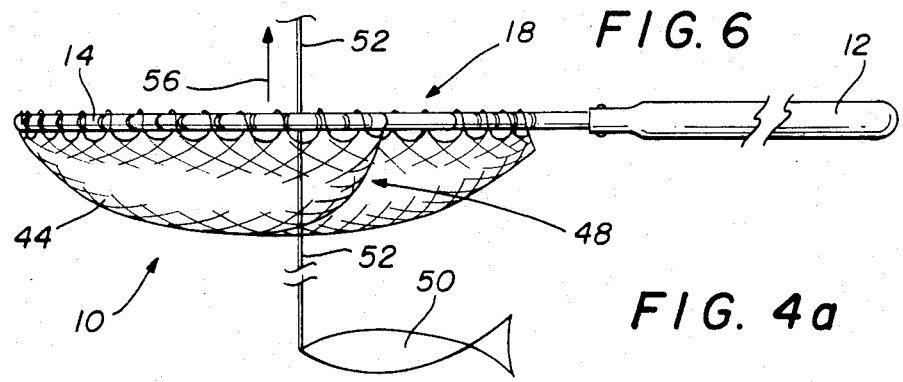
FIG. 4a
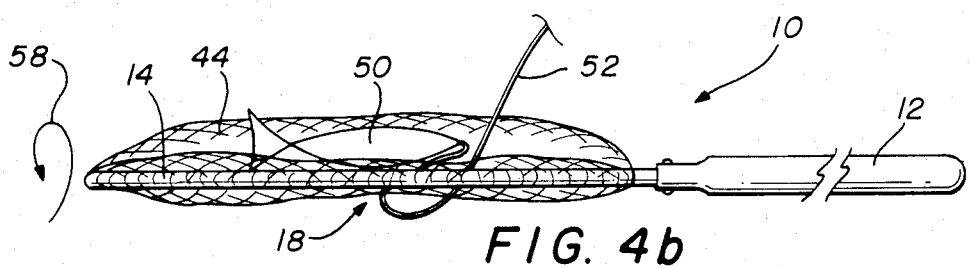
FIG. 4b
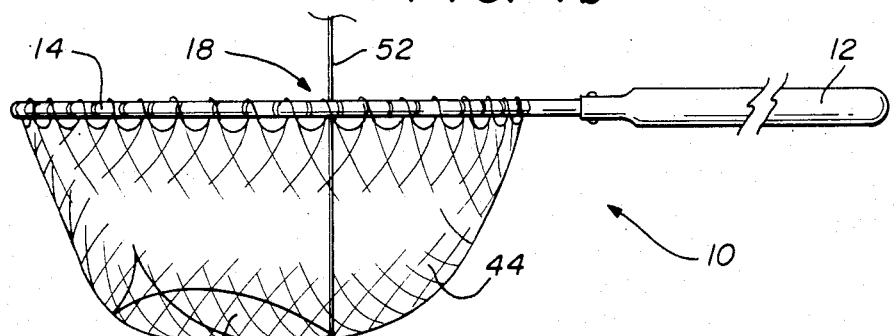
FIG. 4c

FISHING NET

FIELD OF THE INVENTION

This invention relates generally to fishing equipment and more particularly to nets for capturing fish caught on a fishing line.

BACKGROUND OF THE INVENTION

One of the most difficult problems encountered by fishermen is that of capturing a fish that has been caught on a fishing line and transferring the fish to a boat or the shore. As the fish is pulled from the water on the fishing line, its full weight is applied to the fishing line and the hook or lure. This force, along with the frequently vigorous movements of the fish may release the fish from the hook or lure and lead to loss of the fish. Nets have been developed in the past to enable the fisherman to capture the fish while the fish is adjacent the surface of the water. Such conventional nets typically include an elongated handle attached to a looping frame that defines an opening. A net is attached to the perimeter of the frame and enables the fish to be captured by placing the fishing net beneath the fish and then bringing the net upwards so that the fish passes through the opening defined by the frame and into engagement with the net.

However, such conventional nets have proved to be unsatisfactory in that it is sometimes difficult to maintain the net beneath the fish with one hand while holding the fishing rod and lifting the struggling fish in the other hand. U.S. Pat. No. 4,450,643, entitled "Fishing Net" shows a modified fishing net in which a "U" shaped member is pivotally mounted on the frame of the fishing net at a point directly opposite where the frame is attached to a handle. While stored, the "U" shaped member is disposed subtantially in a plane defined by the frame of the net. During use, the "U" shaped member is rotated and locked in a position perpendicular to the frame so as to distend the net. The fishing line leading to the fish is maneuvered into engagement within the "U" shaped member while the net is inverted and inclined at an angle. As the fishing line is retracted, the fish is drawn upwards into the net, guided by the "U" shaped member. The net is then uprighted with the fish captured in the net.

However, U.S. Pat. No. 4,450,643, although an improvement over existing fishing net designs still suffers from several inefficiencies and limitations. For instance, the rapid and erratic movement of the fish, the movement of the boat or of the current in the water, and the location of the "U" shaped member at the most remote point of the frame of the fishing net, all require that great care be taken that the net be continuously repositioned or the fishing line will be pulled out of the "U" shaped member. Further, the construction of the fishing net in the U.S. Pat. No. 4,450,643 requires that the net must be correctly inverted and orientated during use, which is an undesirable distraction for the fisherman. Further, the requirement that the "U" shaped member be locked into a perpendicular position during use prevents the net from being used as a standard dip net. None of the conventional fishing nets adequately solve the problems discussed above.

SUMMARY OF THE INVENTION

The present invention provides a fishing net having an elongated handle connected to and supporting a frame defining an opening. A flexible net portion is attached to the perimeter of the frame and is adapted to capture a fish or the like. A guide member is pivotally mounted in a gap in the frame and is normally disposed during use in the opening defined by the frame. The guide member is adapted to receive a fishing line extending perpendicularly through the frame opening, thereby aligning the fishing line with the fishing net. A latch member is mounted on the guide member so as to retain the fishing line once inserted into the guide member. The guide member is rotatable in either direction from the plane defined by the frame so that the net of the present invention may be used in either orientation during use. As a fishing line is pulled upwards through the guide member, the fish is placed in engagement with the underside of the net. The net, handle and frame is then quickly inverted so that the fish falls through the frame opening to capture the fish. Although the guide member may be located anywhere along the perimeter of the frame, preferably the guide member is oriented at an oblique angle with respect to the handle of the fishing net so as to facilitate the engagement of the guide member by the fishing line.

Therefore, it is a principal feature and advantage of this invention to provide an improved fishing net.

It is another feature and advantage of this invention to provide an improved fishing net having a guide member adapted for receiving a fishing line and for aligning the fishing line with the net.

It is yet another feature and advantage of this invention to provide an improved fishing net having a guide member and a latch member for securing the fishing line extending through the guide member.

It is another feature and advantage of this invention to provide an improved fishing net which is symmetrical about a horizontal axis.

BRIEF DESCRIPTION OF THE DRAWINGS

So that the manner in which the above recited features and advantages of the invention, as well as others which will become apparent to those skilled in the art, are obtained and can be understood in detail, a more particular description of the invention briefly summarized above may be had by reference to the embodiments thereof which are illustrated in the accompanying drawings, which drawings form a part of the specification and in which like numerals depict like parts in the several views. It is noted, however, that the appended drawings illustrate only a preferred embodiment of the invention and are therefore not to be considered limiting of its scope, for the invention may admit to other equally effective embodiments.

FIG. 3 is a detailed view of the guide member and latch member of FIG. 2 indicating the location of a fishing line therewithin.

FIG. 4A is a side view of the fishing net of this invention in a first position engaged with a fishing line on which a fish is caught.

FIG. 4B is a side view of the fishing net of FIG. 1 in a second position with the fish adjacent the net.

FIG. 4C is a side view of the fishing net of FIG. 1 in a third position with the fish captured in the net.

FIG. 5 is a detailed view of an alternate embodiment of a guide member in which a slot is formed for receiving and retaining a fishing line.

FIG. 6 is a detailed view of the slot in the guide member of FIG. 5.

DETAILED DESCRIPTION OF THE INVENTION

Figure 1:
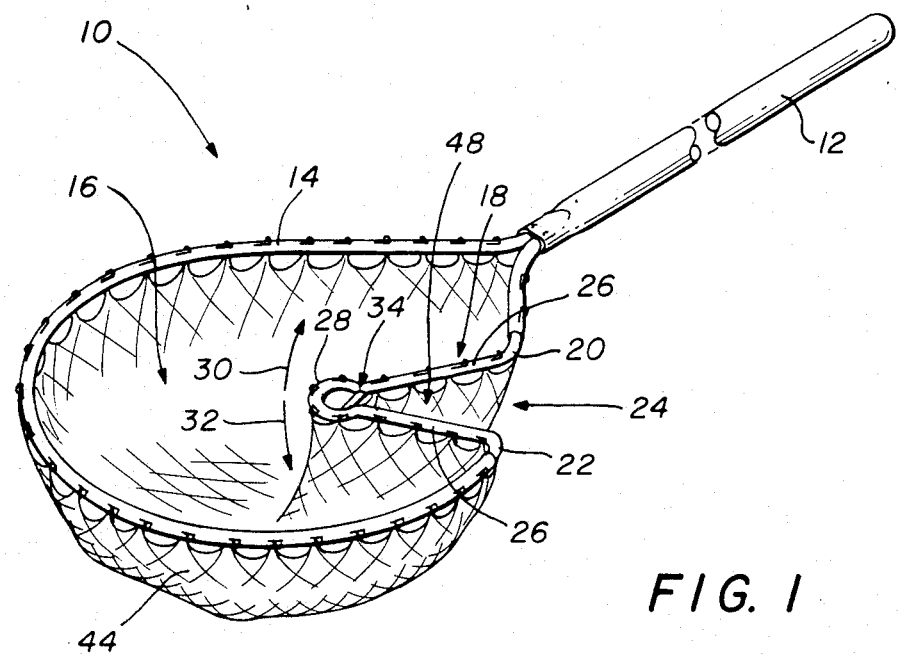
FIG. 1 is a perspective view of a fishing net according to the present invention.
Figure 2:
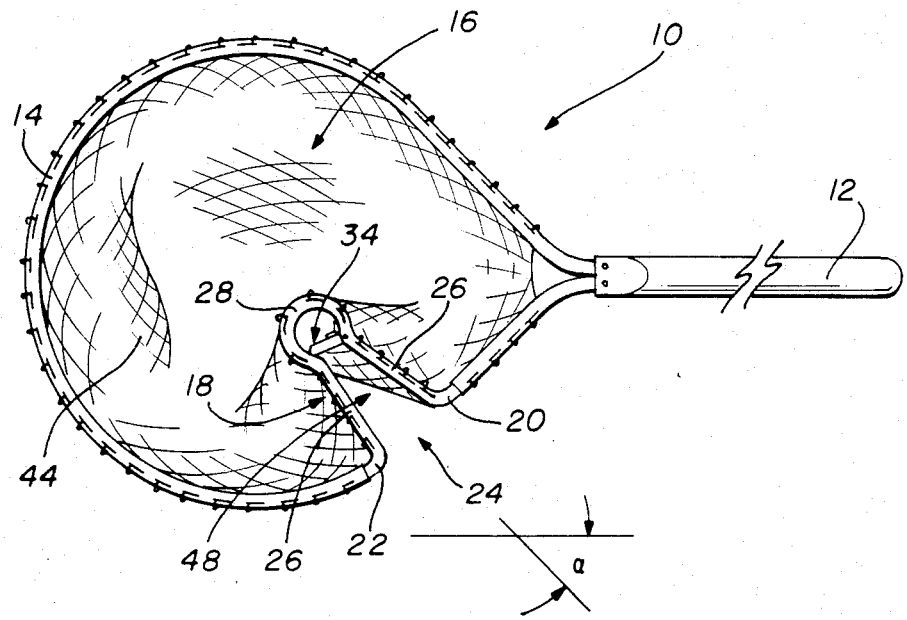
FIG. 2 is a top view of the fishing net of FIG. 1.

Referring first to FIGS. 1 and 2, there is shown fishing net 10 including rigid, elongate handle 12 adapted for manual gripping thereof. Looping rigid frame 14 is attached to one end of the handle. Although illustrated as formed in a generally oval shape, frame 14 may be configured in any desirable contour, such as round or square, so as to define opening 16. Guide member 18 is pivotally mounted at either end (as at 20 and 22) to the ends of the frame in a gap formed therein. The guide member extends inwardly of the perimeter of the frame, but in the preferred embodiment of the invention, the guide member does not extend across the center of opening 16. The guide member includes enlarged mouth 24, converging arms 26, terminating in circular portion 28. The guide member is normally disposed in the opening defined by the frame, but it is capable of unobstructed rotational movement on either side of the frame in rotational directions 30 and 32 in FIG. 1.

Latch member 34, shown in detail in FIG. 3, is mounted on the guide member at the juncture of the circular portion and the converging arms. The latch member is adapted to enable a perpendicular fishing line to pass into the circular portion, but to prevent the fishing line to escape therefrom. Specifically, the latch member includes tooth 36 pivotally mounted on one of the arms 26 and extending transversely across to the opposing arm. Tooth 34 is resiliently biased by spring 38 outwardly from the circular portion in counter clockwise direction 40 (as seen in FIG. 3) to the transverse position shown, engaging detent 39 formed in the guide member at the juncture of the circular section and an arm 26. Thus, the latch member enables fishing line 52 to pass into the circular portion extending perpendicularly therethrough by overcoming the force of spring 38 and deflecting the tooth. The fishing line is prevented from leaving the circular portion by the tooth, unless the tooth is deliberately deflected in clockwise direction 42 into the circular portion. Detent 39 is substantially equal in depth to the thickness of the tooth and prevents random movement of the fishing line within the circular section from deflecting the tooth in direction 42 and allowing the fishing line to emerge from the guide member.

Referring now also to FIGS. 1 and 2, net 44 is provided to envelope the fish and is constructed in a flexible manner, such as a mesh constructed of nylon, rubber or similar material. The net forms a downwardly depending generally concave structure and is attached to the perimeter of the frame and to the edge of the guide member so as to form pocket 48 projecting into the remainder of the net. The net may be attached to a plurality of slots 46, shown in FIG. 3 and formed in the perimeter of the frame and edge of the guide member at regular intervals to match the construction of the net. Other conventional arrangements may be used to attach the net to the frame and guide member, if desired.

In operation, the guide member is disposed in the plane defined by the frame and projecting inwardly into opening 16, with the net distended a relatively short distance from the frame, as shown in FIGS. 1 and 4A. Fish 50 has become caught on a fishing lure or fishing hook (not shown) at the end of fishing line 52. Fishing net 10 has been placed in an upright position and maneuvered so that the fishing line is extending through guide member 18 and is retained in the circular portion thereof as previously described with respect to FIG. 3. As shown in FIG. 3, the guide member is located on the frame at an oblique angle α with respect to handle 12. Although the guide member may be located anywhere along the perimeter of the frame, the illustrated location, or an equivalent location on the other side of the frame, enables the fishing net to be pushed past the fishing line and then to be pulled back adjacent the fishing line, so that the fishing line is guided into mouth 24 and between arms 26 of the guide member into the circular portion. The fishing line is then pulled upwards in direction 56 so as to bring the fish adjacent to or in contact with net 44 in pocket 48. The fishing net of this invention is then rapidly inverted by rotation in direction 58 (or in the opposite rotational direction) about the axis of the handle so that the fish is positioned on top of the net, as shown in FIG. 4B. In FIG. 4C, the weight of the fish has caused the net to fall through the frame and to be distended by the weight of the fish a relatively great distance, compared to that as shown in FIG. 4A, thus securely capturing the fish. In this position, the fishing net may be retrieved by the fisherman and the fish detached from the fishing line and removed from the fishing net.

Since the fishing net is symmetrical about a horizontal axis (that is, the guide member is capable of pivotal movement in either rotational direction from the frame and the net may likewise be distended in either direction about the frame), it is not necessary to orient the fishing net in one particular way prior to use. Further, since the guide member is normally disposed in the opening defined by the frame, the fishing net of the present invention may be used as a conventional dip net, if desired. Finally, in the illustrated embodiment, the fishing line is easily inserted into the guide member and securely retained there by the latch member until manually extracted.

Although the invention has been disclosed above, with regard to particular and preferred embodiments, these are advanced for illustrative purposes only, and are not intended to limit the scope of this invention. For instance, it is within the spirit and scope of this invention to provide a fishing net having more than one guide member pivotally mounted to the frame, wherein only one of the guide members is in use at a time and locking means are provided to secure the remaining guide members in place in the plane defined by the frame. Further, the locking means may be provided for a single guide member, as in the illustrated embodiment, to facilitate the use of the fishing net as a conventional dip net. Finally, the latch member 34 may be omitted from the guide member, if desired. One form of this alternate embodiment of the latch member is shown in FIGS. 5 and 6. Circular section 28 is mounted on converging arms 26. However, in place of the latch member 34, slot 60 is formed in the circular member intermediate the juncture of the converging arms and the circular section. The width of the slot is relatively narrow, preferably no greater than twice the diameter of fishing line 52. Beveled edges 62 are formed on the outer end of the slot and in cooperation with the converging arms, guide fishing line 52 into the circular section. Once inside of the circular section, random movement of the fishing line is unlikely to move the fishing line back through the slot. In the preferred embodiment of the invention, slot 60 is inclined at angle β with respect to the upright fishing line, further securing the fishing line within the circular section. This embodiment of the invention is advantageous in that it eliminates the tooth and spring shown in FIG. 3. These variations remain within the invention as claimed below.

What is claimed is:

1. A fishing net for use in capturing a fish caught on a fishing line or the like, comprising:
   (a) an elongated handle adapted for manual support of the fishing net;
   (b) a rigid frame mounted on the end of said handle, said frame defining an opening;
   (c) an inwardly extending guide member pivotally mounted to either end in a gap in the perimeter of said frame for rotational movement on either side of said opening of said frame, said guide member for receiving the fishing line extending therethrough;
   (d) a flexible net mounted on said frame and guide member and adapted to capture the fish, whereby the fishing line may be pulled upwards through said guide member so as to engage the fish in said net; and
   (e) a latch member mounted on said guide member and adapted to enable the fishing line to enter said guide member but preventing the fishing line from leaving said guide member so as to assist in guiding the fish into engagement with said net as the fishing line is pulled through said guide member.

2. The fishing net of claim 1 wherein said latch member comprises a tooth pivotally mounted on one end of said guide member and extending across said guide member, said latch member further including spring means mounted on said guide member adjacent said pivotal connection of said tooth and in contact with said tooth so as to urge said tooth toward said guide member whereby the fishing line is secured in said guide member by said tooth.

3. The fishing net of claim 1 wherein said latch member comprises a circular section mounted on said guide member and a radial slot formed in said circular section for receipt of a fishing line so as to enable the fishing line to enter said circular section but preventing the fishing line from leaving said circular section.

4. The fishing net of claim 3, wherein said radial slot is inclined at a predetermined angle with respect to said circular section.

5. A fishing net for use in capturing a fish caught on a fishing line or the like, comprising:
   (a) an elongated handle adapted for manual support of the fishing net;
   (b) a rigid frame mounted on an end of said handle, said frame defining an opening;
   (c) an inwardly extending guide member pivotally mounted at either end in a gap in the perimeter of said frame and extending into said frame opening, said guide member being adapted to receive the fishing line extending therethrough;
   (d) a flexible net mounted on said frame and said guide member and adapted to capture fish, whereby the fishing line may be pulled upwards through said guide member so as to engage the fish in said net; and
   (e) a latch member mounted on said guide member and adapted to enable the fishing line to enter said guide member, but preventing the fishing line from leaving said guide member so as to assist in guiding the fish into engagement with said net as the fishing line is pulled through said guide member.

6. The fishing net of claim 5, wherein said latch member comprises a tooth pivotally mounted on one end to said guide member and extending across said guide member, said latch member further including spring means mounted on said guide member adjacent said pivotal connection of said tooth and in contact with said tooth so as to urge said tooth toward said guide member, whereby the fishing line is secured in said guide member by said tooth.

7. The fishing net of claim 5, further comprising a plurality of said inwardly extending guide members, each pivotally mounted at either end to a gap in the perimeter of said frame and each adapted to receive the fishing line.

8. The fishing net of claim 5, wherein said guide member is wider adjacent the perimeter of said frame and converges in the interior of said frame.

9. The fishing net of claim 5, wherein said guide member is located on said frame at an oblique angle with respect to said handle.

10. The fishing net of claim 5, wherein said latch member includes a circular section mounted on said guide member and a radial slot formed in said circular section for receipt of the fishing line so as to enable the fishing line to enter said circular section but preventing the fishing line from leaving said circular section.

11. The fishing net of claim 10, wherein said radial slot is inclined at a predetermined angle with respect to said circular section.

12. A fishing net for use in capturing a fish caught on a fishing line or the like, comprising:
   (a) an elongate handle adapted for manual support of the fishing net;
   (b) a rigid frame mounted on an end of said handle, said frame defining an opening;
   (c) at least one inwardly extending guide member pivotally mounted at either end to said frame in a gap in the perimeter thereof, said guide member being disposed in said opening defined by said frame and adapted to receive the fishing line extending generally perpendicularly therethrough; and
   (d) a latch member mounted on said guide member and adapted to enable the fishing line to enter said guide member, but preventing the fishing line from leaving said guide member; and
   (e) a flexible net mounted on the perimeter of said frame and said guide member and adapted to capture fish, whereby the fishing line may be pulled upwards through said guide member and the frame inverted so as to engage the fish in said net.

13. The fishing net of claim 12, wherein said guide member is located on said frame at an oblique angle with respect to said handle.

14. The fishing net of claim 12, wherein said latch member comprises a tooth pivotally mounted on one end to said guide member, said latch member further including spring means mounted on said guide member adjacent said pivotal connection of said tooth and in contact with said tooth so as to urge said tooth toward said guide member whereby the fishing line is secured in said guide member by said tooth.

15. The fishing net of claim 12 wherein said latch member includes a circular section mounted on said guide member and a radial slot formed in said circular section adapted for receipt of the fishing line so as to enable the fishing line to enter said circular section preventing the fishing line from leaving said circular section.

* * * * *